(12) United States Patent
Marchan et al.

(10) Patent No.: US 11,052,510 B2
(45) Date of Patent: Jul. 6, 2021

(54) IMPRINT DEVICE FOR IMPRINTING A SURFACE OF AN OBJECT TO CREATE AN IDENTIFICATION MARK

(71) Applicant: TREDCO METALS, LLC, Miami, FL (US)

(72) Inventors: Francisco Marchan, Samborondon (EC); Alejandro Ruiz, Quito (EC)

( * ) Notice: Subject to any disclaimer, the term of this patent is extended or adjusted under 35 U.S.C. 154(b) by 129 days.

(21) Appl. No.: 16/371,404

(22) Filed: Apr. 1, 2019

(65) Prior Publication Data

US 2020/0306932 A1 Oct. 1, 2020

(51) Int. Cl.
*B24C 1/10* (2006.01)
*B24C 5/02* (2006.01)

(52) U.S. Cl.
CPC . *B24C 1/10* (2013.01); *B24C 5/02* (2013.01)

(58) Field of Classification Search
CPC .. B24C 1/10; B24C 1/221; B24C 5/02; B24C 3/02; B24C 3/04; B24C 3/06; B24C 3/32; B24C 1/04; B21D 31/06; C21D 7/06
USPC .......................................................... 72/53
See application file for complete search history.

(56) References Cited

U.S. PATENT DOCUMENTS

| | | | | | |
|---|---|---|---|---|---|
| 353,432 | A | * | 11/1886 | Sachs | F41A 3/58 42/40 |
| 1,054,069 | A | * | 2/1913 | Wilson | F41A 3/58 42/41 |
| 2004/0202980 | A1* | | 10/2004 | Policicchio | B05B 7/1413 433/88 |
| 2006/0252357 | A1* | | 11/2006 | Bohler | B24C 7/0053 451/90 |
| 2013/0280991 | A1* | | 10/2013 | Loubeyre | B24C 5/04 451/90 |
| 2018/0274890 | A1* | | 9/2018 | Havens | F42B 33/12 |

FOREIGN PATENT DOCUMENTS

GB 2284500 A * 6/1995 ............. B60R 13/10

OTHER PUBLICATIONS

Screen captures from YouTube video clip entitled "Remington 12ga #4 Buckshot Ballistic Gel Test," 4 pages, uploaded on Dec. 3, 2012, by user "Mrgunsngear Channel." Retrieved from Internet: <https://www.youtube.com/watch?v=w6cmGHz-4O4> (Year: 2012).*

* cited by examiner

*Primary Examiner* — Adam J Eiseman
*Assistant Examiner* — Matthew Stephens
(74) *Attorney, Agent, or Firm* — Sanchelima & Associates, P.A.; Christian Sanchelima; Alexander Rodriguez

(57) ABSTRACT

The present invention is an imprint device for imprinting a unique identification mark on a surface of an object with imprinting particles of different sizes that increase uniqueness and without the need for electric power. The imprint device includes a vertical member, a hammer member, a trigger assembly, a charging unit, a barrel and at least one pocket. In the operative configuration, a trigger of trigger assembly is activated such that hammer member impacts a cartridge filled with at least one munition of imprinting particles and releases imprinting particles. The imprinting particles travel through the barrel where acceleration is increased and impact on surface is made to form microcraters and unique identification marks. The imprinting particles can be of same size, material and shape or they can be of different sizes, material and shapes or the combination thereof for increasing uniqueness.

7 Claims, 4 Drawing Sheets

IMPRINT DEVICE FOR IMPRINTING A SURFACE OF AN OBJECT TO CREATE AN IDENTIFICATION MARK

BACKGROUND OF THE INVENTION

1. Field of the Invention

The present disclosure relates to an imprint device for imprinting a surface of an object. More particularly, the present disclosure relates to an imprint device for imprinting a surface of an object to create a unique identification mark.

2. Description of the Related Art

Original metal objects such as automobile parts, currency coins and precious metal coins are subjected to be exchanged with duplicate ones. Hence, there is a need for an imprint device that imprints a unique identification mark on a surface of an object to authenticate object at any point in time.

Several designs for various identification marking devices and anti-forging marker devices have been designed in the past. None of them, however, include an imprint device that imprints a unique identification mark on a surface of an object by bombarding imprinting particles. Additionally, none of the prior designs work without the need of cost-intensive electric power, laser machines or similar other equipment. Furthermore, the present invention is also not limited to imprinting only conductive materials.

Applicant believes that a related reference corresponds to a Russian patent 2654547 filed by SHKILEV V D for a device for identification mark manufacturing. The SHKI-LEV patent discloses a device for the manufacture of identification marks with matrices, obtained by treatment with particles, accelerated to high speeds. However, the device requires a laser device and nano-tubes defined with inlet and outlet having conical inserts which are structurally complex components and also cost intensive.

Another related application is Chinese patent number 2361639 by Huang Qingwen for an anti-forging marker device for metal device. The patent '639 discloses an anti-counterfeiting mark device for a metal element which is composed of a high vacuum cabin and an ion emission component. However, the requirement of high vacuum cabin and ion emission component is cost intensive.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide an imprint device for imprinting a unique identification mark on a surface of an object with the bombardment of imprinting particles of different sizes, shapes and materials which increases the uniqueness of imprint without the need of electric power.

It is another object of the present invention to provide an imprint device for imprinting on a surface of an object that includes a cartridge that when hammered bombards imprinting particles of variable sizes. Additionally, the usage of variable sizes increases uniqueness of identification mark.

It is still another object of the present invention to provide an imprint device for imprinting on a surface of an object that is usable in mines because of no requirement of electric power.

It is yet another object of the present invention to provide an imprint device for imprinting on a surface of an object that has fewer moving parts and structurally fewer complex components. The components are also easily replaceable at low cost.

It is still another object of the present invention to provide an imprint device for imprinting on a surface of an object of any type of material and not limited to the use of conductive materials.

It is still another object of the present invention to provide an imprint device for imprinting on a surface of an object that imprints an identification mark of the desired size.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
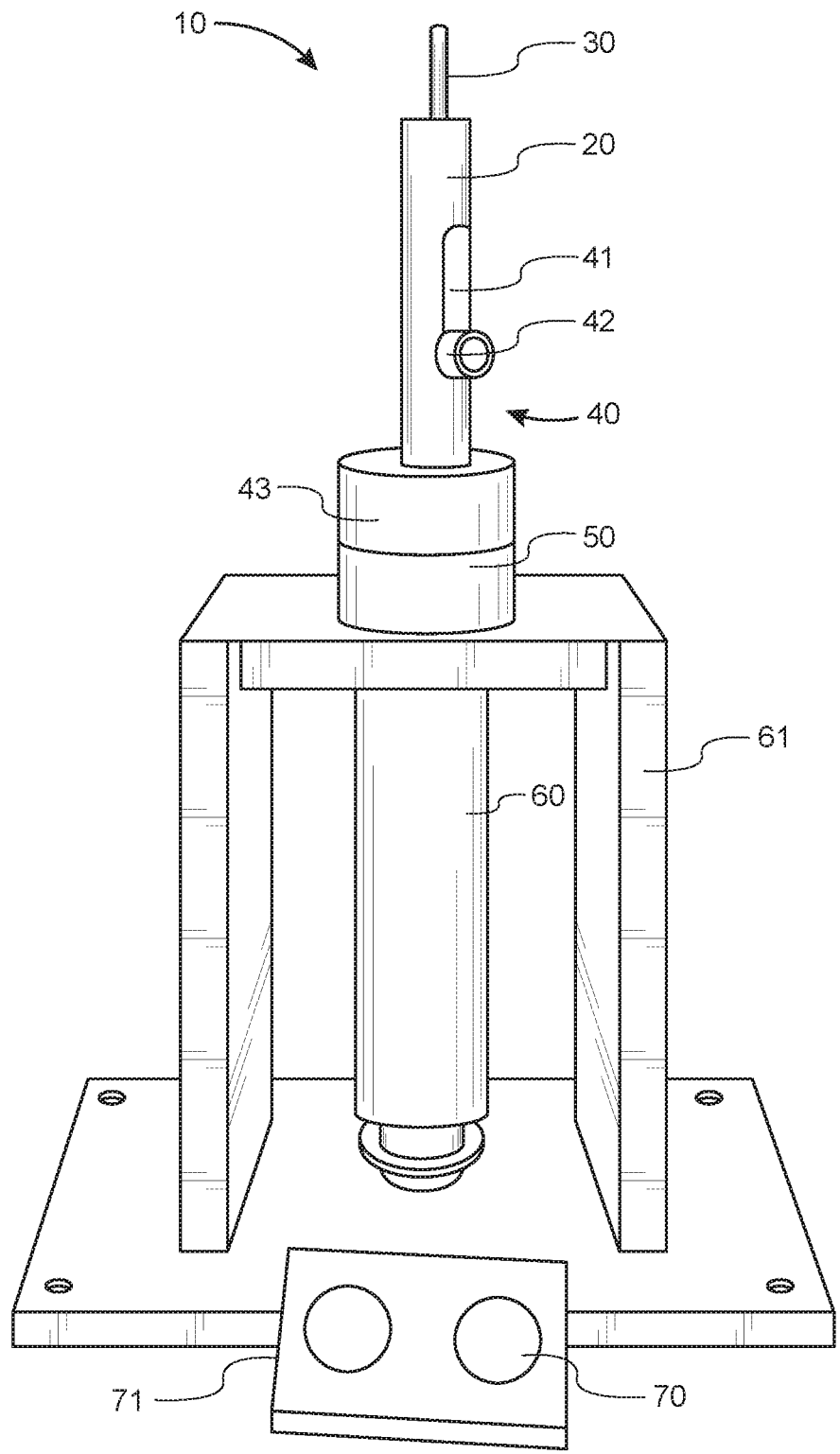
FIG. 1 represents a perspective view of an imprint device 10. The imprint device 10 is defined with a vertical member 20, a hammer member 30, a trigger assembly 40, a charging unit 50, a barrel 60 and at least one pocket 70.
Figure 2:
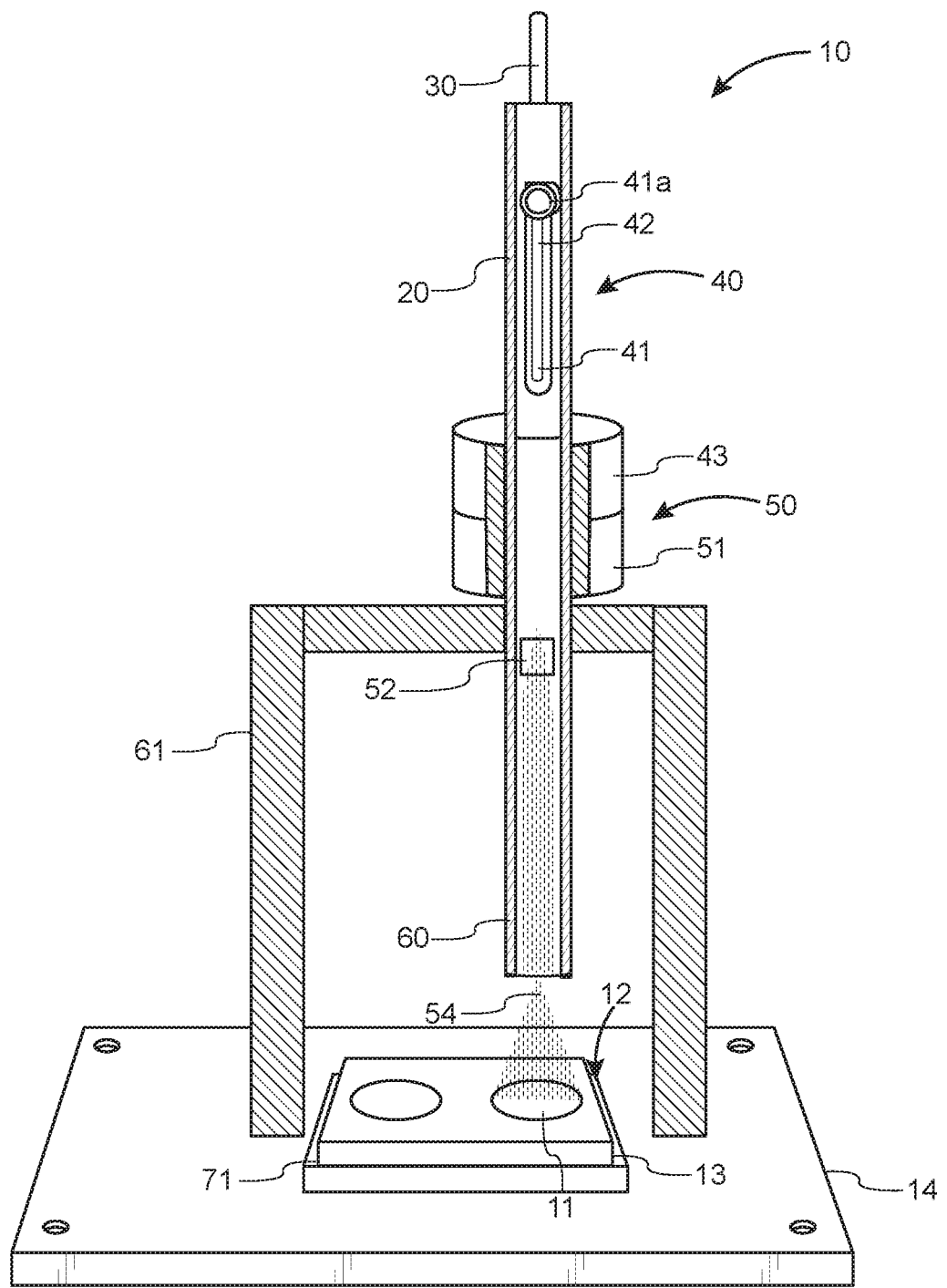
FIG. 2 represents an internal view of imprint device 10 depicting bombarding of imprinting particles on surface 12 of object 13.
Figure 3:
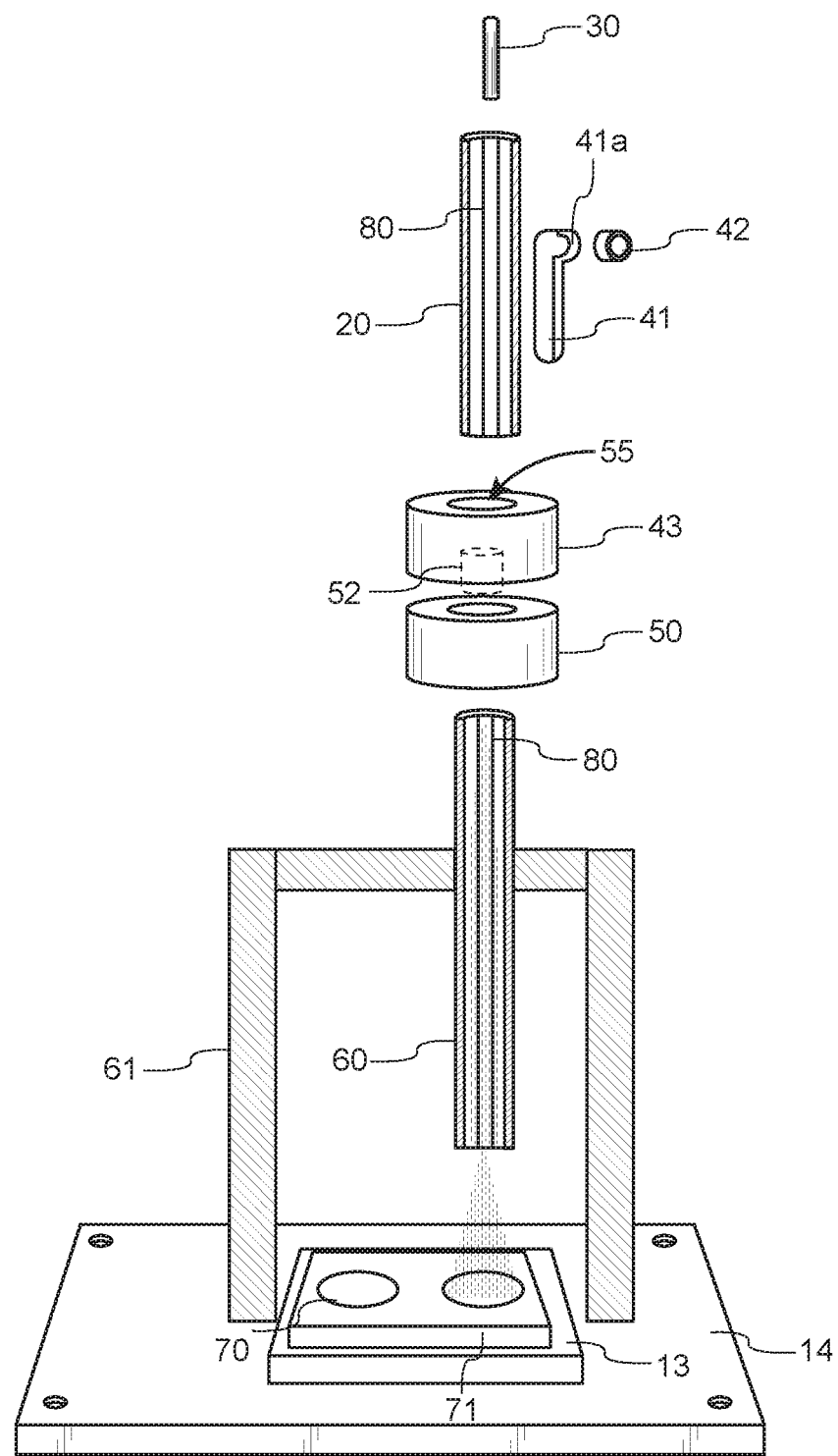
FIG. 3 represents an exploded view of imprint device 10.
Figure 4:
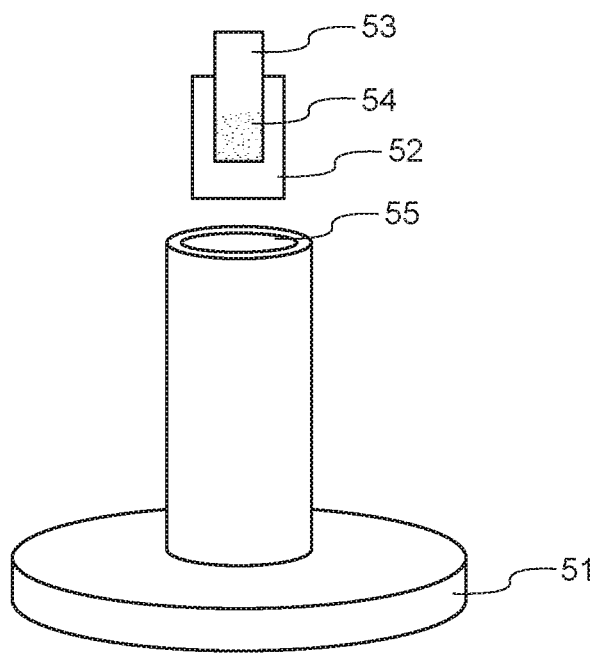
FIG. 4 represents a perspective view of introducing a cartridge 50 in a charging member base 51.
Figure 5:
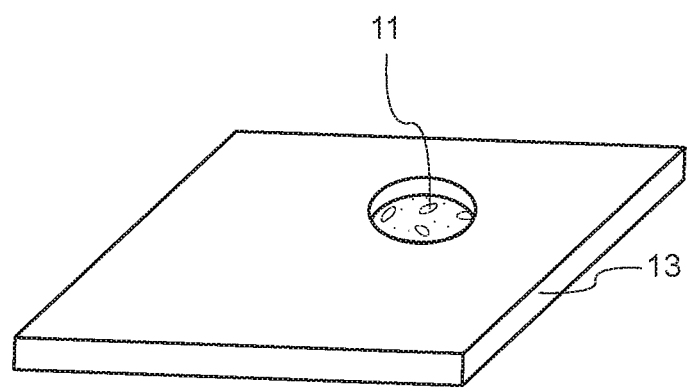
FIG. 5 represents a perspective view of object 13 imprinted with microcraters/cavities 11 resembling a unique identification mark.

Referring now to the drawings, FIGS. 1-5, where the present invention is generally referred to with numeral 10, it can be observed that an imprint device 10, in accordance with one embodiment, is provided for imprinting unique identification marks in form of microcraters 11 on a surface 12 of an object 13 positioned on a substantially flat support 14 that mainly includes a vertical member 20, a hammer member 30, a trigger assembly 40, a charging unit 50, a barrel 60 and at least one pocket 70.

Vertical member 20 houses a hammer member 30 and a trigger assembly 40.

Hammer member 30 is movable within vertical member 20. More specifically, hammer member 30 slides up and down within vertical member 20 that acts as a guide.

Trigger assembly 40 permits and restricts movement of hammer member 30 in vertical member 20. Trigger assembly 40 includes a trigger slot 41, a trigger 42 and a trigger mounting member 43. Trigger slot 41 is configured in vertical member 20 and guides the movement of trigger 42. Trigger slot 41 is defined with a trigger resting slot 41a in which trigger 42 in an inoperative configuration rests. Trigger 42 in an operative configuration permits hammer member 30 to strike the cartridge having munition within charging unit 50. Trigger mounting member 43 is connected at the base of the vertical member 20.

Charging unit 50 is connected to the vertical member 20 through the trigger mounting member 43. Charging unit includes a charging member base 51 and a cartridge 52 with at least one munition 53 filled with imprinting particles 54. Munition 53 is filled upside down in cartridge 52. In one embodiment, charging member base 51 is in screw connection with trigger mounting member 43. Though the present disclosure is described with charging member base 51 and trigger mounting member 43 are in screw connection with each other, however, charging member base 51 and trigger mounting member 43 can be removably connected with each other by other connecting means. Charging member base 51 is defined with a hole 55 for inserting and refilling cartridge 52 having at least one munition 53 filled with imprinting particles 54. Imprinting particles 54 are of a hard material in comparison with the hardness of the material of the object 13. Imprinting particles 54 can be of the same sizes or variable sizes. Imprinting particles 54 can be of same shape or different shapes. Imprinting particles 54 can be of a regular shape or irregular shapes. Further, imprinting particles 54 can be of the same material or different material. Variable sizes, shapes and/or materials are preferred to increase the uniqueness of imprint. In the event when object 13 is a metal, imprinting particles 54 are preferred to be of a tungsten carbide grit owing to be harder. In an operative configuration, hammer member 30 strikes munition 53 which upon impact release imprinting particles 54.

Barrel 60 is an elongated element standing vertically and is connected to charging member base 51. In one embodiment, barrel 60 is supported by a frame 61 such that barrel 60 stands vertically. Barrel 60 receives released imprinting particles 54 from charging unit 50 which flows through barrel 60. Barrel 60 permits free flow and propelling of imprinting particles 54 which increases the acceleration of imprinting particles 54.

Vertical member 20, trigger mounting member 43, charging member base 51 and barrel 60 have a through central hole 80. Vertical member 20 permits movement of hammer member 30 in central hole 80. Trigger mounting member 43 permits hammer member 30 to pass through central hole 80 to strike cartridge 52 disposed in charging member base 51 and hit munition 53 to release imprinting particles 54 in central hole 80 of barrel 60. In barrel 60, imprinting particles 54 free-flows through central hole 80.

At least one pocket 70 is positioned on surface 12 of object 13 and acts as a guide to direct imprinting particles 54 after released from barrel 60 and during striking. In one embodiment, a pocket frame 71 is provided that includes a plurality of pockets 70 of the same size or variable sizes or the same shape or variable shapes. More pockets 70 results in more uniqueness of imprint that can be achieved.

The present disclosure also discloses a method for imprinting unique identification mark on surface 12 of object 13. The method includes positioning object 13 on flat support 14 and under barrel 60. Cartridge 52 with at least one munition 53 filled with imprinting particles 54 is introduced in charging member base 51, wherein imprinting particles 54 is of a hard material in comparison with the hardness of the material of the object 13. Further, imprinting particles 54 can be of the same size or different sizes, the same shape or different shape, a regular shape or irregular shape, same material or different material and combinations thereof. At least one pocket 70 is positioned on the surface 12 of the object 13. Actuating trigger 42 of trigger assembly 40 to slide in trigger slot 41 configured on a vertical member 20 for permitting hammer member 30 to move in vertical member 30 and strikes cartridge 52 to cause the explosion of imprinting particles 54. Exploded imprinting particles 54 randomly move through barrel 60 and are ejected therefrom. Ejected imprinting particles 54 are randomly directed at pocket 70 to strike the surface 12 of the object 13 for imprinting microcraters 11 that resembles a unique identification mark. Ejected imprinting particles 54 falls in a chaotic manner and microcraters 11 so formed forms an irreproducible random dispersion pattern and is microscopic.

Objects 13, herein the present disclosure, is made of a metal material or a metal alloy, however, the material of the object 13 is not limited of being metal or metal alloy and can be of any material and imprinting particles 54 so selected should be of higher hardness as compared to the material of object 13.

Imprint device 10 of the present disclosure can also be useful for bankers, assayers, jewelers, manufacturers or individuals or companies dealing with high-value items.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An imprint device for imprinting a surface of an object, said imprint device comprising:
   a trigger assembly including a hammer member, a trigger, and a trigger slot having a trigger resting slot to hold said trigger in in-operative configuration;
   a charging unit mounted to said trigger assembly and housing a cartridge;
   said trigger assembly being hollow and permitting said hammer to strike said cartridge;
   a barrel mounted to said charging unit wherein a munition is configured to be delivered to at least one pocket located within a support surface;
   said munition has a first hardness;
   said at least one pocket has a second hardness; and
   said first hardness is greater than said second hardness.

2. The imprint device as claimed in claim 1, wherein said trigger assembly comprises a trigger mounting member, wherein said trigger mounting member is in screw connection with said charging unit, said trigger slot configured in a vertical member.

3. The imprint device as claimed in claim 1, wherein said imprinting particles are at least one of same size or different sizes, same shapes or different shapes, regular shape or irregular shape, same material or different materials and combinations thereof.

4. The imprint device as claimed in claim 1, wherein said imprinting particles are at least one of tungsten carbide, steel, sand and ceramic.

5. The imprint device as claimed in claim 1, wherein said charging unit comprises a charging member having a hole for refilling cartridges and said charging member in screw connection with said trigger arrangement.

6. The imprint device as claimed in claim 1, wherein said barrel is supported by a frame.

7. An imprint device for imprinting a surface of an object, said imprint device comprising:
   a vertical member;
   a hammer member movable in said vertical member;

a trigger arrangement comprises a trigger slot, a trigger and a trigger mounting member, said trigger slot configured in said vertical member and having a trigger resting slot to hold said trigger in in-operative configuration, said trigger operable to permit and restrict movement of said hammer member in said vertical member;

a charging unit in screw connection with said trigger mounting member, said charging unit configured to receive and be refillable with a cartridge filled with at least one munition of imprinting particles, said imprinting particles being of a harder material in comparison with the hardness of the material of the object, said cartridge is configured to be hammered by said hammer member to release imprinting particles, said charging unit comprises a charging member having a hole for refilling cartridges and said charging member in screw connection with said trigger arrangement;

a barrel configured to direct released imprinting particles to randomly impact the surface of the object and imprint microcraters, said barrel defined having a spring; and a frame to support said barrel;

at least one pocket positionable on the surface of the object to guide randomly directed imprinting particles received from said barrel, wherein said imprinting particles are at least one of same size or of different sizes, same shape or different shapes, regular shape or irregular shape, same material or different materials or combinations thereof, wherein said imprinting particles are at least one of tungsten carbide, steel, sand and ceramic.

* * * * *